United States Patent
Gruber et al.

(10) Patent No.: US 7,797,496 B2
(45) Date of Patent: Sep. 14, 2010

(54) MULTIPROCESSOR SYSTEM HAVING A SHARED TIGHTLY COUPLED MEMORY AND METHOD FOR COMMUNICATION BETWEEN A PLURALITY OF PROCESSORS

(75) Inventors: Hans-Georg Gruber, München (DE); Carsten Mielenz, Landsberg (DE)

(73) Assignee: Infineon Technologies AG, Neubiberg (DE)

( * ) Notice: Subject to any disclaimer, the term of this patent is extended or adjusted under 35 U.S.C. 154(b) by 1208 days.

(21) Appl. No.: 10/941,119

(22) Filed: Sep. 15, 2004

(65) Prior Publication Data

US 2005/0193081 A1 Sep. 1, 2005

(30) Foreign Application Priority Data

Feb. 27, 2004 (DE) .................... 10 2004 009 497

(51) Int. Cl.
*G06F 12/00* (2006.01)
*G06F 13/00* (2006.01)

(52) U.S. Cl. ...................................... 711/147; 711/148

(58) Field of Classification Search ............. 711/E12.09
See application file for complete search history.

(56) References Cited

U.S. PATENT DOCUMENTS

| | | | | | |
|---|---|---|---|---|---|
| 5,386,511 | A | * | 1/1995 | Murata et al. ............... | 711/120 |
| 5,522,058 | A | * | 5/1996 | Iwasa et al. ................. | 711/145 |
| 5,627,976 | A | * | 5/1997 | McFarland et al. .......... | 710/309 |
| 6,643,763 | B1 | * | 11/2003 | Starke et al. ................. | 712/11 |

OTHER PUBLICATIONS

Karl Guttag et al.; "A Single-Chip Multiprocessor for Multimedia: The MVP"; Texas Instruments, Houston, TX; computer Graphics and Applications; IEEE, vol. 12, Issue 6, pp. 53-64, Nov. 1992.

* cited by examiner

*Primary Examiner*—Mardochee Chery
(74) *Attorney, Agent, or Firm*—Dickstein, Shapiro, LLP.

(57) ABSTRACT

A multiprocessor system comprises a first processor (P1) and a second processor (P2) each having an input/output set up for the connection of a tightly coupled semiconductor memory. Furthermore, the multiprocessor system comprises a shared tightly coupled integrated semiconductor memory (101), which can be accessed by both processors (P1, P2) via their input/output.

26 Claims, 4 Drawing Sheets

FIG 1   Prior Art

FIG 2   General Application Flow

MULTIPROCESSOR SYSTEM HAVING A SHARED TIGHTLY COUPLED MEMORY AND METHOD FOR COMMUNICATION BETWEEN A PLURALITY OF PROCESSORS

PRIORITY

This application claims priority to German application no. 10 2004 009 497.7 filed Feb. 27, 2004.

TECHNICAL FIELD OF THE INVENTION

The present invention relates to a multiprocessor system having at least two embedded processors and to a method for communication between the processors.

BACKGROUND OF THE INVENTION

In modern multiprocessor systems there is the need for communication between the individual processors, i.e. the processors must be able to interchange both data and instructions (commands) among one another. In accordance with FIG. 1, traditional multiprocessor systems having processors P1, P2 use a shared memory 1 for interchanging data or instructions, which shared memory is connected via a bus architecture 2 both to the first processor P1 and to the second processor P2. The interaction of the two processors P1, P2 can be controlled or synchronized by means of interrupts (commands for interrupting the current CPU cycle). A further possibility for interactive control of the memory access consists in providing semaphores, i.e. a software-controlled identification (flag), defining which of the processors is permitted to exercise a write access to the shared memory 1. Furthermore, it is known to connect a plurality of processors to one or a plurality of shared memories 1 via a switchable connection (crossbar switch).

The known solutions are not very effective if a fast interaction between the processors is required. Although the interchange of data or else instructions (i.e. the programming of one processor by the other processor) is possible by means of the known measures described above, it is too slow for computation- and data-intensive tasks with real-time requirements, such as occur for example in modern communications systems.

In order to accelerate the data processing in the processors P1, P2, it is already known for the latter to be coupled in each case to a tightly coupled fast memory integrated on the chip, a so-called TCM (tightly coupled memory). One example of a processor that can be equipped with a TCM is described in the data sheet "FlexCore® ARM926EJ-S™ 32-bit RISC Processor Cores", http://lsilogic.com/files/docs/marketing-docs/microprocessors/arm926ej-s_flexcore_db.pdf. The TCM is a DRAM, SRAM or flash memory that can essentially be directly connected to the processor core and can be accessed singly and solely by the processor P1, P2 equipped with the respective TCM. Processors P1, P2 that can be equipped with a TCM have an input/output intended specifically for the TCM—a so-called TCM interface—and also a suitable address generating unit for generating the addresses for the TCM. In comparison with processors without a TCM, processors P1, P2 with a TCM have an improved performance for dealing with computation- and data-intensive tasks. In the multiprocessor system shown in FIG. 1, both processors P1, P2 are equipped with a TCM 3. However, for applications requiring a high processor interaction, the real-time behaviour that can be achieved with this solution still remains unsatisfactory.

For some years, complex heterogeneous systems have increasingly been realised on a single chip. These so-called SoC (system-on-chip) realisations contain one or a plurality of embedded programmable components—processor cores for general tasks, DSP cores or cores of application-specific processors—and also further components such as, for example, an analogue front end, on-chip memory, input/output devices and other application-specific integrated circuits.

The starting point for the development of an SoC is the definition of the processes or tasks that have to be dealt with by the SoC. Afterwards, it is necessary to find a suitable software/hardware partitioning. In this case, it is important to enable a high-performance task scheduling and a high-performance intertask communication in order to be able to comply with real-time requirements. At the same time, it is necessary to fulfil the customary requirements (small space requirement, low power consumption).

The document U.S. Pat. No. 6,643,763 B1 describes a multiprocessor system in which a tight connection between two processors is realised via a register pipeline with FIFO (First-In First-Out) buffers.

SUMMARY OF THE INVENTION

The invention is based on the object of specifying a multiprocessor system comprising processors embedded in a single chip, said multiprocessor system being well suited to computation- and data-intensive time-critical applications. In particular, the intention is to be able to obtain a low power consumption and a small space requirement. Furthermore, the invention aims to specify a method for communication between two processors with good performance in the case of computation- and data-intensive time-critical applications.

The objective on which the invention is based can be achieved by a chip-integrated multiprocessor system comprising a first processor and a second processor each having an input/output set up for the connection of a tightly coupled semiconductor memory, and a shared tightly coupled integrated semiconductor memory, which can be accessed by both processors via their input/output.

The processors each may have an address generating unit which is assigned to the input/output and realises the address generation for accessing the shared tightly coupled semiconductor memory. The address generation for accessing the shared tightly coupled semiconductor memory may be effected by means of a DMA address generating unit assigned to the input/output of the first and/or the second processor. A compression/decompression module can be arranged between the input/output of the first and/or the second processor and the shared tightly coupled semiconductor memory. An encryption/decryption module can be arranged between the input/output of the first and/or the second processor and the shared tightly coupled semiconductor memory. One or a plurality of buffer memories can be arranged between the input/output of the first and/or the second processor and the shared tightly coupled semiconductor memory. The shared tightly coupled semiconductor memory may have one or a plurality of private memory areas which can be accessed in each case by only a single processor. The shared tightly coupled semiconductor memory can be a two-port memory. The shared tightly coupled semiconductor memory can be assigned a semiconductor memory expansion, in particular an SRAM memory, which can be accessed by the processors via the inputs/outputs. One processor can be a digital signal processor and the other processor is a RISC microprocessor. The processors furthermore each may have further inputs/outputs via which they are connected via a bus architecture to a further shared memory.

The object can furthermore be achieved by a chip-integrated multiprocessor system comprising a first processor and a second processor each having an input/output set up for the connection of a tightly coupled semiconductor memory, the shared tightly coupled integrated semiconductor memory coupled with said first and second processor, which can be accessed by both processors via their input/output, wherein the shared tightly coupled semiconductor memory has one or a plurality of private memory areas which can be accessed in each case by only a single processor, and a processing module arranged between the input/output of the first and/or the second processor and the shared tightly coupled semiconductor memory.

The processors each may have an address generating unit which is assigned to the input/output and realizes the address generation for accessing the shared tightly coupled semiconductor memory. The address generation for accessing the shared tightly coupled semiconductor memory can be effected by means of a DMA address generating unit assigned to the input/output of the first and/or the second processor. The processing module can be a compression/decompression module or an encryption/decryption module. One or a plurality of buffer memories can be arranged between the input/output of the first and/or the second processor and the shared tightly coupled semiconductor memory. The shared tightly coupled semiconductor memory can be a two-port memory. The shared tightly coupled semiconductor memory can be assigned a semiconductor memory expansion, in particular an SRAM memory, which can be accessed by the processors via the inputs/outputs. One processor can be a digital signal processor and the other processor can be a RISC microprocessor. The processors furthermore each may have further inputs/outputs via which they are connected via a bus architecture to a further shared memory.

The object can also be achieved by a method for communication between two processors of a chip-integrated multiprocessor system which each have an input/output for accessing a shared tightly coupled semiconductor memory comprising the steps of:

writing of data and/or instructions to the shared semiconductor memory by the first processor; and reading of the data and/or instructions that have been written to the shared tightly coupled semiconductor memory by the first processor by the second processor.

The method may also comprise the following steps:

compression and/or encryption of the data and/or instructions that have been output by the first processor by means of a compression and/or encryption circuit;

writing of the compressed and/or encrypted data and/or instructions to the shared tightly coupled semiconductor memory;

decompression and/or decryption of the data/or instructions that are to be read from the shared tightly coupled semiconductor memory by the second processor by means of a decompression and/or decryption circuit; and reading of the decompressed and/or decrypted data and/or instructions by the second processor.

The method may also comprise the following steps:

temporary storage of data and/or instructions that are to be read from the shared tightly coupled semiconductor memory or are to be written to the shared tightly coupled semiconductor memory in at least one buffer memory.

The method may also comprise the following steps:

storage of data and/or instructions in an expansion memory assigned to the shared semiconductor memory by the first and/or the second processor.

The chip-integrated multiprocessor system according to the invention comprises a first processor and a second processor each having an input/output set up for connection of a tightly coupled semiconductor memory (TCM). According to the invention, the multiprocessor system has a shared tightly coupled integrated semiconductor memory which can be accessed by both processors via their input/output.

The essential basic concept of the invention thus consists in now providing, instead of the tightly coupled semiconductor memories that have been provided separately hitherto for each processor, a shared tightly coupled semiconductor memory for at least two processors and in utilizing it as a fast data and instruction connection between the processors.

What is achieved by the shared tightly coupled semiconductor memory (shared TCM) is that the access rapidity ensured by the tight coupling of the semiconductor memory can now also be utilized for the interaction between the processors, i.e. the interchange of data and instructions. This improves the ability of the processors to carry out intertask communication. The invention thus creates a fast real-time connection between the two processors. It is thereby possible to achieve both the fast transfer of data from one processor to the other and a fast programming (real-time programming), so-called task swapping, of one processor by the other processor. In the case of task swapping, what are transferred dynamically from one processor (which is carrying out the programming) to the other processor (which is being programmed) are always only the program parts of a program that are actually currently required.

It is furthermore advantageous that the shared tightly coupled semiconductor memory according to the invention makes it possible to save chip area on account of the shared utilization of memory area. Furthermore, a reduction of the power consumption is achieved in comparison with the prior art since the number of tightly coupled semiconductor memories is reduced in comparison with the prior art (where each processor has its own TCM).

It is pointed out that the invention's provision of a shared tightly coupled semiconductor memory does not generally necessitate any hardware-technical additional outlay for the addressing of said memory. For the addressing of the shared tightly coupled semiconductor memory, use is made of the address generating units that are already present in the known processors which are designed for operation with a tightly coupled semiconductor memory. It is merely necessary to ensure that a shared address area is declared for the two address generating units in the processors.

In particular, it may be provided that the address generation for accessing the shared tightly coupled semiconductor memory in the first and/or second processor is effected by means of a DMA address generating unit (DMA: Direct Memory Access). DMA address generating units are known in the prior art for their fast access to semiconductor memories. This measure enables an even faster interaction between the processors.

A particularly preferred refinement of the invention is characterized in that a compression/decompression module is arranged between the input/output of the first and/or the second processor and the shared tightly coupled semiconductor memory. This module embodied in dedicated hardware enables an efficient, i.e. memory space conserving utilization of the shared memory area. By way of example, it may be provided that, in the course of writing or reading data and/or instructions to or from specific address areas of the tightly coupled semiconductor memory, the module always carries out a compression/decompression of the data and/or instructions that are to be written or read out. In this way, the quantity of data and/or instructions to be stored in the tightly coupled semiconductor memory can be increased or the memory area can be reduced (for a given quantity).

Furthermore, in addition to or instead of the compression/decompression module, an encryption/decryption module may be provided between the input/output of the processors and the tightly coupled semiconductor memory. This increases the functionality of the solution according to the invention in the processing of security-relevant tasks (e.g. online banking).

Preferably, the shared tightly coupled semiconductor memory has one or a plurality of private memory areas which can be accessed in each case by only a single processor. The privacy of the individual tightly coupled semiconductor memories that is (necessarily) present in the prior art is thus also preserved for the shared tightly coupled semiconductor memory according to the invention (in the private memory areas).

A further particular advantageous refinement of the multiprocessor system according to the invention is characterized in that one or a plurality of buffer memories are arranged between the input/output of the first and/or the second processor and the shared tightly coupled semiconductor memory. The buffer memories make it possible to compensate for transfer time fluctuations, latencies or generally temporal restrictions in the transfer of data and/or instructions between one processor and the other processor. As a result, the connection according to the invention for data/instructions between the two processors becomes more flexible with regard to the control of temporal sequences.

A further advantageous measure is characterized in that the shared tightly coupled semiconductor memory is assigned an expansion memory, in particular an SRAM (static RAM), which can be accessed by the processors via the inputs/outputs. This enables a swapping of data/instructions from the shared tightly coupled semiconductor memory. This has a favourable influence on the memory space economy and creates a swapping possibility for data/instructions that do not currently have to be transferred or are deliberately intended to be held back.

An advantageous embodiment variant is characterized in that one processor is a digital signal processor (DSP) and the other processor is a RISC microprocessor. Generally, however, it is also possible to provide combinations of identical processors (e.g. RISC-RISC or DSP-DSP) or combinations with other processor types with a connection possibility for tightly coupled memories.

BRIEF DESCRIPTION OF THE DRAWINGS

The invention is explained in more detail below on the basis of an exemplary embodiment and variants thereof with reference to the drawings in which.

DETAILED DESCRIPTION OF THE PREFERRED EMBODIMENTS

Figure 2:
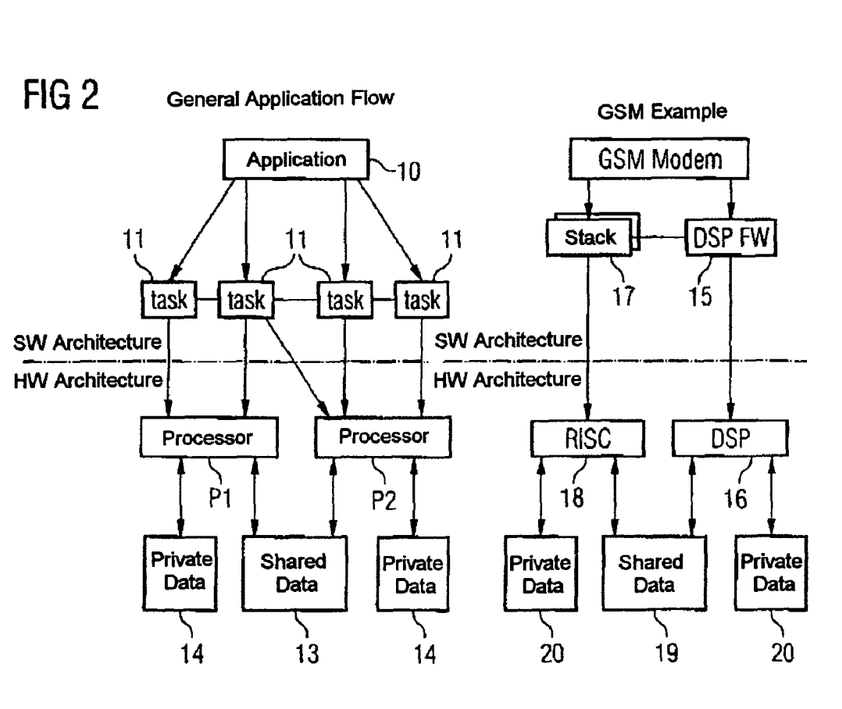
FIG. 2 shows a schematic illustration of the interaction of software and hardware in the implementation of an application for a general multiprocessor system (on the left) and for the specific example of a GSM modem (on the right)

In accordance with the illustration on the left-hand side of FIG. 2, an application 10 is subdivided into a plurality of tasks 11. The application 10 and the tasks 11 are constituent parts of the software (SW), i.e. defined by an application program. The tasks 11 are divided between the two processors P1 and P2 of the hardware (HW). In the context of the tasks 11, data (e.g. received data of a mobile radio receiver) are processed and control signals for the system control are generated. Depending on the division of the tasks 11 between the processors P1, P2, some data or control signals 13 are generated by both processors P1, P2 while other data or control signals 14 are only calculated by one of the processors P1, P2.

In the case of a GSM (Global System for Mobile Communications) modem (illustration on the right-hand side of FIG. 2), the tasks consist on the one hand in a signal processing 15 of useful data which is carried out by a DSP (digital signal processor) 16, and on the other hand in a processing of a protocol stack 17 for generating control signals, which is performed by a RISC microcontroller 18. Data and/or instructions 19 are generated, which can be interchanged between the DSP 16 and the RISC microcontroller 18 and also private data 20, which are only accessed by in each case one of the two processors 16, 18.

Figure 3:
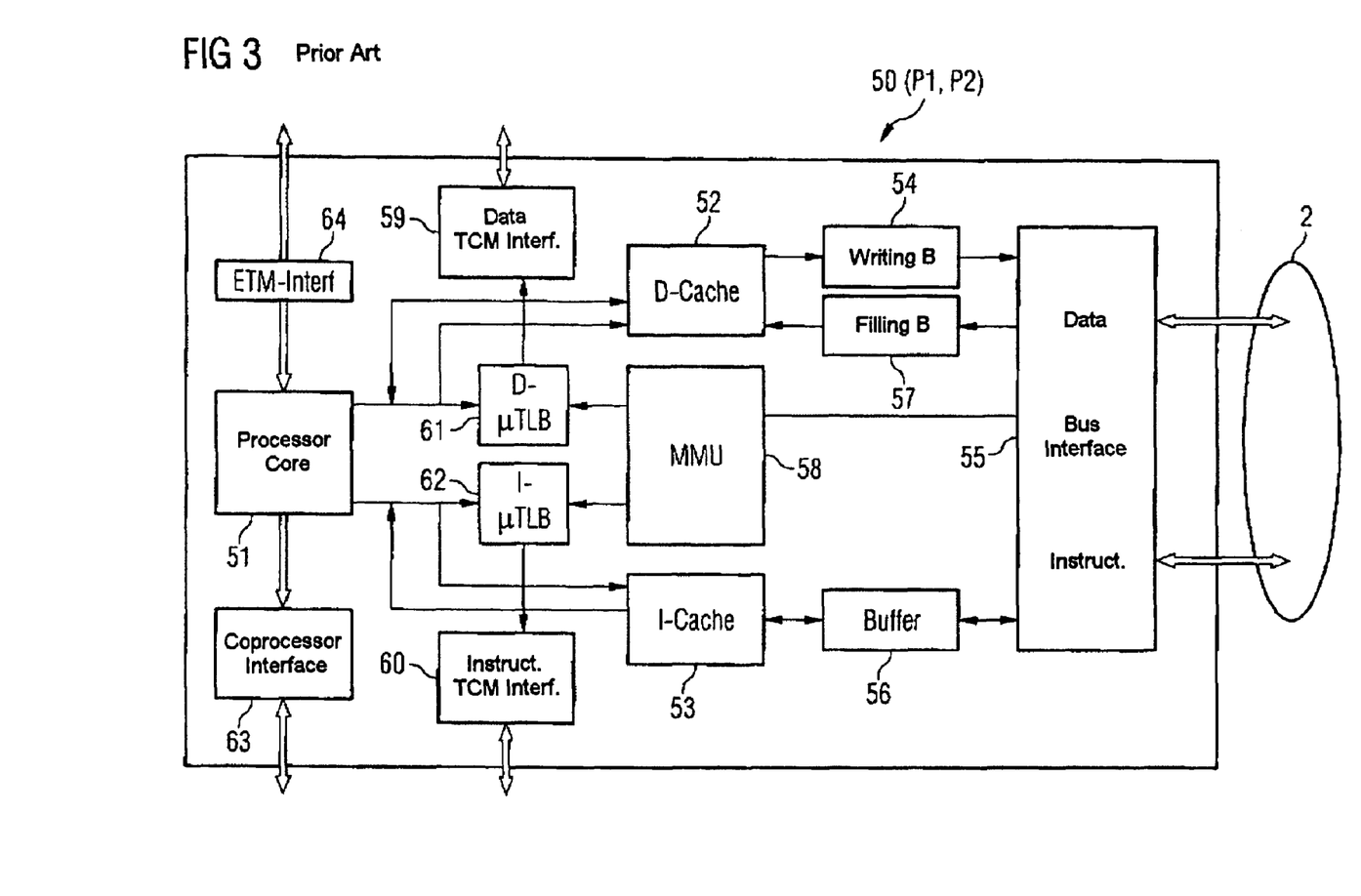
FIG. 3 shows an illustration of the architecture of a known embedded processor with inputs/outputs for the connection of a tightly coupled memory.

FIG. 3 shows, in a simplified illustration using the example of the known RISC processor ARM926EJ-S™ 50, the construction of a processor having inputs/outputs for the connection of a tightly coupled semiconductor memory (TCM). The central constituent part of the processor 50 is the processor core 51, in which the instruction set is implemented. The processor core 51 is connected to a bus interface 55 for the data bus 2 via a data cache memory 52 and a writing buffer memory 54. Instructions are forwarded from the processor core 51 via an instruction cache memory 53 and a buffer memory 56 to the bus interface 55, or are received from the latter. In the input direction, the bus interface 55 is connected to the processor core 51 via a filling buffer memory 57 and the data cache memory 52.

The processor 50 furthermore has a central address generating unit MMU (Memory Management Unit) 58 and also a data TCM interface 59 and an instruction TCM interface 60. Said TCM interfaces 59 and 60 are specifically designed for the connection of a TCM 3, which can be connected directly to the outputs/inputs of the TCM interfaces 59, 60. Instructions and data from the processor core 51 are conducted to the data TCM interface 59 and to the instruction TCM interface 60 via a data TLB (Translation Lookaside Buffer) 61—also called data associative memory—and, respectively, via an instruction TLB 62—also called instruction associative memory. The associative memories 61, 62 may also be considered to be constituent parts of the MMU 58, the task of which is to generate (virtual) addresses for the memory accesses.

In addition to the above-described interfaces (bus interface 55 and TCM interfaces 59, 60), the processor 50 also has a coprocessor interface 63 for connection of a coprocessor and an ETM (Embedded Trace Macrocell) interface 64, which is used for program development. These two interfaces are not important for the present invention.

As can be gathered from FIG. 3, the connection between the process core 51 and the TCM interfaces 59, 60 has no writing and filling buffer memories and no cache memory. It is known to the person skilled in the art that the input/output of data and/or instructions can be carried out significantly faster via the TCM interfaces 59, 60 than via the bus interface 55.

Figure 1:
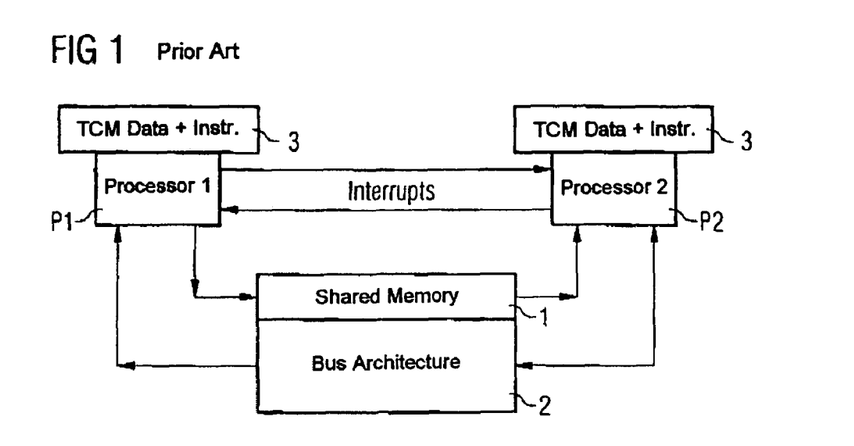
FIG. 1 shows a schematic illustration of a multiprocessor system with a shared memory linked via a bus architecture and in each case a tightly coupled memory (TCM) for each processor.
Figure 4:
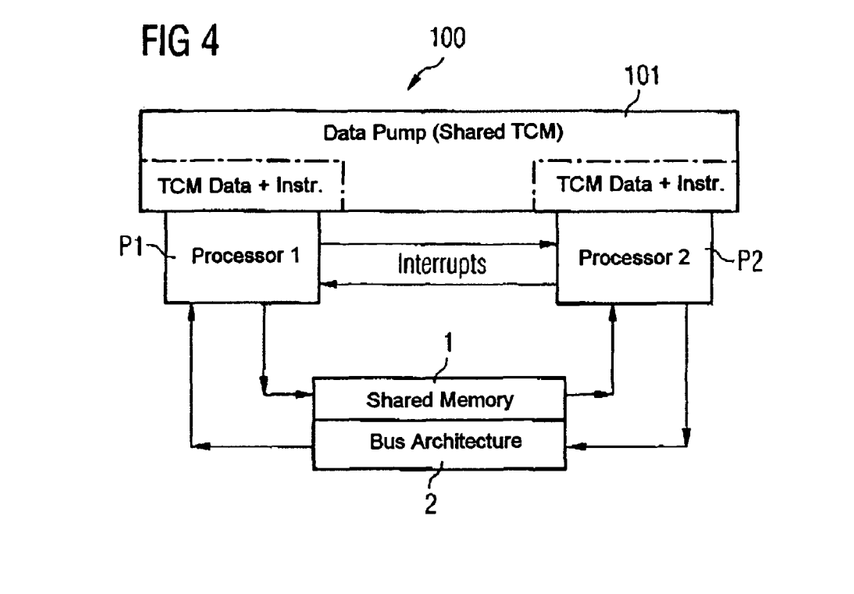
FIG. 4 shows a schematic illustration of an exemplary embodiment of a multiprocessor system according to the invention with a shared tightly coupled memory.

FIG. 4 shows a schematic illustration of the multiprocessor system according to the invention. Components identical to those in FIG. 1 are designated by the same reference symbols. The essential difference from the microprocessor circuit shown in FIG. 1 is that the processors P1 and P2 are assigned a shared tightly coupled semiconductor memory (shared TCM) 101. The shared TCM 101 has two logical inputs/outputs, in each case one for each processor P1, P2. Physically, however, the shared TCM 101 may be embodied as a two-port memory (dual ported RAM) or as a one-port memory (single ported RAM). The shared TCM 101 forms the main constituent part of the fast connection that transfers data and instructions between the processors P1, P2, and is referred to hereinafter as "data pump" 100.

The multiprocessor system is realised as an SoC solution, i.e. the processors P1, P2 and also the data pump 100 are hardware modules embedded in the chip.

The functioning of the SoC multiprocessor system shown in FIG. 4 is explained below by way of example with reference to the illustration shown (on the right) in FIG. 2:

A task 10 consists for example in reading data from a lookup table and processing said data further in accordance with a predetermined application algorithm. Since the RISC microcontroller P1 has a good performance for reading data from a table, this part of the task is performed by the RISC microcontroller P1. The data processing has to be carried out by the DSP P2 in the next cycle. In order to achieve a fast communication of the data read out, the latter are forwarded from the RISC microcontroller 1 to the DSP P2 via the shared TCM 101. This requires write operations by the RISC microcontroller P1 and read operations by the DSP P2.

It is pointed out that the processors P1 and P2 may be structurally unchanged with respect to the processors P1 and P2 each having a dedicated TCM 4 which are illustrated with respect to the prior art in FIG. 1—that is to say may be realised e.g. by the known processor 50 illustrated in FIG. 3. In particular, the address generating units MMU (embodied in hardware) in the respective processors P1 and P2 may remain unchanged. A DMA may also be used as address generating unit MMU. Moreover, it is pointed out that the application software (i.e. the application program 10) also does not have to be modified in any way if, according to the invention, a shared TCM 101 is used as data pump between the processors P1, P2. The hardware independence—important for the reusability of the application program 10—with regard to the solution according to the invention is thus maintained for the application program 10. The approach according to the invention is therefore markedly openOS-friendly (OS: Operating System).

Figure 5:
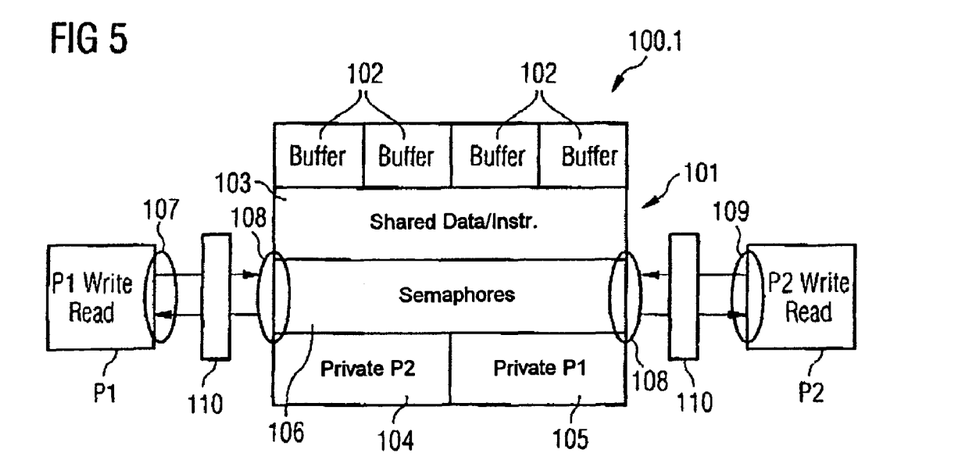
FIG. 5 shows a schematic illustration of a first variant of the fast connection according to the invention between the processors.

FIG. 5 shows a first example 100.1 for the data pump 100. The latter comprises a TCM realised as a DRAM memory 101, and also a plurality of optional buffer memories 102. The DRAM memory 101 has various memory areas: a shared memory area 103 that can be accessed (i.e. writing and reading access) by both processors P1 and P2 is mandatory. Furthermore, a private memory area 104 may be provided for the processor P1 (e.g. RISC microcontroller 18) and a private memory area 105 may be provided for the processor P2 (e.g. DSP 16). For the purpose of controlling the communication between the processors P1 and P2, the DRAM memory 101 may furthermore contain a memory area 106 for semaphores (flags).

The processor P1 accesses the tightly coupled DRAM memory 101 in a customary manner (i.e. via a data line (not illustrated), an address line (not illustrated) and a write/read changeover (not illustrated)). The same applies to the processor P2.

A compression/decompression module 110 may be arranged between the input/output 107 of the processor P1 and the input/output 108 of the DRAM memory 101. In the event of a write access on the part of the processor P1, the module 110 optionally carries out a compression or no compression of the data/instructions that are written to the DRAM memory 101. In the event of a read access, the module 110 automatically detects the status (compressed/not compressed) of the data/instructions to be read out and automatically carries out a decompression or no decompression in a manner dependent on the detected status. The input/output 107 of the processor P1 corresponds to the input/output of the data TCM interface 59 and the input/output of the instruction TCM interface 60 in FIG. 3.

The optional compression/decompression of data/instructions to be written/to be read by the module 110 may be effected for example by the module 110 being informed under software control via a configuration register (not illustrated) of the module 110, of the address area of the DRAM memory 101 in which compressed data are to be stored. In the event of a write or read access, the module 110 is informed of the write or read address, and the module 110 checks whether or not the current address is present in the address area provided for storing compressed data. If this address area is addressed, the module 110 is activated; otherwise it remains inactive (or is deactivated).

The processor P2 (DSP) accesses the DRAM memory 101 in an analogous manner. The input/output of the processor P2 is designated by the reference symbol 109. It likewise corresponds to the input/output of the data TCM interface 59 and the input/output of the instruction TCM interface 60 in FIG. 3.

The buffer memories 102 are arranged in the signal path between the input/output 107 of the processor P1, and respectively the input/output 109 of the processor P2, and the input/output 108 of the DRAM memory 101 (the schematic illustration shown in FIG. 5 is intended merely to illustrate the (optional) presence of the buffer memories 102). As is generally known, the buffer memories 102 enable the relaxation of time restrictions (occurrence of latencies) and the withholding of data packets e.g. in the case of data corruption.

Figure 6:
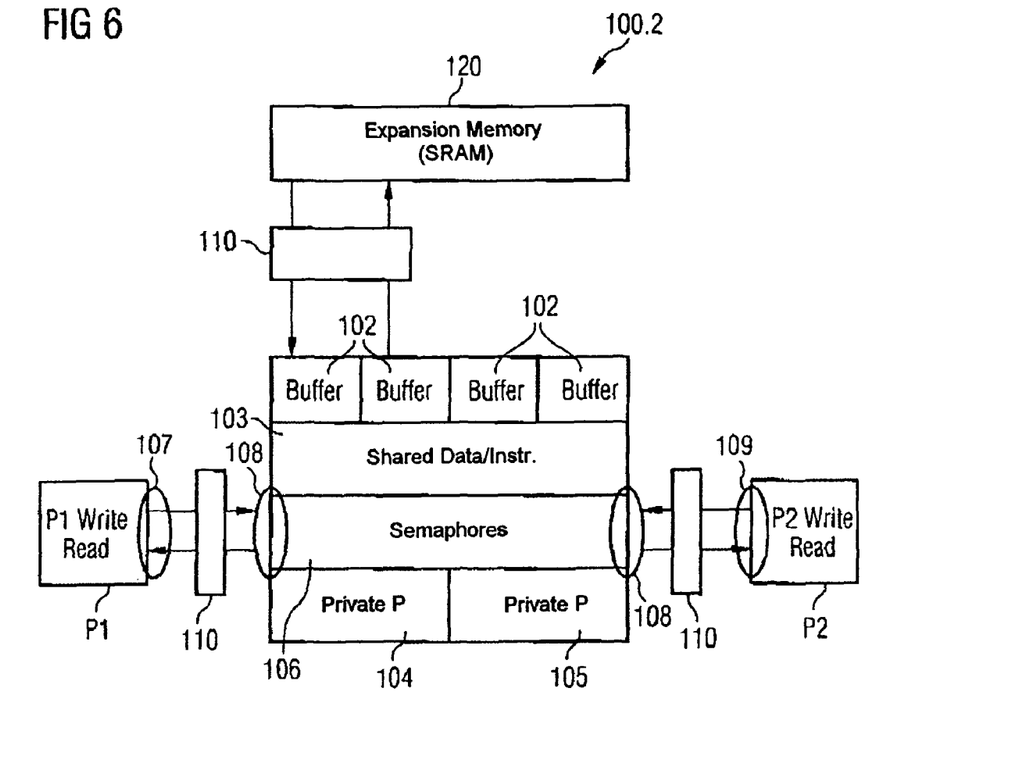
FIG. 6 shows a schematic illustration of a second variant of the fast connection according to the invention between the processors.

FIG. 6 shows a second variant 100.2 of the data pump 100 according to the invention. Components identical to those in FIG. 5 are designated by the same reference symbols.

The data pump 100.2 illustrated schematically in FIG. 6 additionally comprises an expansion memory 120, which is connected via a compression/decompression module 110 to the DRAM memory 101, i.e. also to the input/output 107 of the processor P1 and the input/output 109 of the processor P2. The functioning of the module 110 has already been explained. The expansion memory 120 may be embodied as an SRAM memory and constitutes a memory expansion for the data pump 100.2.

Instead of or in addition to the compression/decompression, the module 110 may also perform an encryption/decryption. This is likewise effected by means of a suitable dedicated hardware. Analogously to the address-area-dependent functioning of the module 110 in the case of data/instruction compression/data/instruction decompression, the encryption of a datum and/or of an instruction may also be automatically performed or omitted depending on the address allocated thereto.

It is pointed out that the tightly coupled semiconductor memory 101 may be of arbitrary design, in principle, and may be realised for example as a DRAM, SRAM or flash memory. DRAM and SRAM memories enable particularly fast access times, while the flash memory affords the advantages of a non-volatile memory.

We claim:

1. A chip-integrated multiprocessor system comprising:
a first processor and a second processor each having an input/output set up for the connection of a tightly coupled semiconductor memory, and
a shared tightly coupled integrated semiconductor memory, which can be accessed by both the first and second processors via their input/output.

2. The chip-integrated multiprocessor system according to claim 1, wherein the first and second processors each have an address generating unit which is assigned to the input/output and realises the address generation for accessing the shared tightly coupled semiconductor memory.

3. The chip-integrated multiprocessor system according to claim 1, wherein the address generation for accessing the shared tightly coupled semiconductor memory is a DMA address generating unit assigned to the input/output of the first and/or the second processor.

4. The chip-integrated multiprocessor system according to claim 2, wherein the address generation for accessing the shared tightly coupled semiconductor memory is a DMA address generating unit assigned to the input/output of the first and/or the second processor.

5. The chip-integrated multiprocessor system according to claim 1, wherein a compression/decompression module is arranged between the input/output of the first and/or the second processor and the shared tightly coupled semiconductor memory.

6. The chip-integrated multiprocessor system according to claim 1, wherein an encryption/decryption module is arranged between the input/output of the first and/or the second processor and the shared tightly coupled semiconductor memory.

7. The chip-integrated multiprocessor system according to claim 1, wherein one or a plurality of buffer memories are arranged between the input/output of the first and/or the second processor and the shared tightly coupled semiconductor memory.

8. The chip-integrated multiprocessor system according to claim 1, wherein the shared tightly coupled semiconductor memory has one or a plurality of private memory areas which can be accessed in each case by only a single processor.

9. The chip-integrated multiprocessor system according to claim 1, wherein the shared tightly coupled semiconductor memory is a two-port memory.

10. The chip-integrated multiprocessor system according to claim 1, wherein the shared tightly coupled semiconductor memory is assigned a semiconductor memory expansion, in particular an SRAM memory, which can be accessed by the first and second processors via the inputs/outputs.

11. The chip-integrated multiprocessor system according to claim 1, wherein one processor is a digital signal processor and the other processor is a RISC microprocessor.

12. The chip-integrated multiprocessor system according to claim 1, wherein the first and second processors each have further inputs/outputs which are connected by a bus architecture to a further shared memory.

13. A method for communication between two processors of a chip-integrated multiprocessor system which each has an input/output for accessing a shared tightly coupled semiconductor memory comprising the steps of:
writing data and/or instructions to the shared tightly coupled semiconductor memory by the first processor; and
reading by the second processor the data and/or instructions that have been written to the shared tightly coupled semiconductor memory by the first processor.

14. The method according to claim 13, comprising the following steps:
compressing and/or encrypting the data and/or instructions that have been output by the first processor by means of a compression and/or encryption circuit;
writing the compressed and/or encrypted data and/or instructions to the shared tightly coupled semiconductor memory;
decompressing and/or decrypting the data/or instructions that are to be read from the shared tightly coupled semiconductor memory by the second processor using a decompression and/or decryption circuit; and
reading the decompressed and/or decrypted data and/or instructions by the second processor.

15. The method according to claim 13, comprising the following steps:
temporarily storing data and/or instructions that are to be read from the shared tightly coupled semiconductor memory or are to be written to the shared tightly coupled semiconductor memory in at least one buffer memory.

16. The method according to claim 14, comprising the following steps:
temporarily storing data and/or instructions that are to be read from the shared tightly coupled semiconductor memory or are to be written to the shared tightly coupled semiconductor memory in at least one buffer memory.

17. The method according to claim 13, comprising the following steps:
storing data and/or instructions in an expansion memory assigned to the tightly coupled shared semiconductor memory by the first and/or the second processor.

18. A chip-integrated multiprocessor system comprising:
a first processor and a second processor each having an input/output set up for the connection of a tightly coupled semiconductor memory,
a shared tightly coupled integrated semiconductor memory coupled with said first and second processor, which can be accessed by both the first and second processors via their input/output, wherein the shared tightly coupled semiconductor memory has one or a plurality of private memory areas which can be accessed in each case by only a single processor, and
a processing module arranged between the input/output of the first and/or the second processor and the shared tightly coupled semiconductor memory.

19. The chip-integrated multiprocessor system according to claim 18, wherein the first and second processors each have an address generating unit which is assigned to the input/output and realises the address generation for accessing the shared tightly coupled semiconductor memory.

20. The chip-integrated multiprocessor system according to claim 18, wherein the address generation for accessing the shared tightly coupled semiconductor memory is a DMA address generating unit assigned to the input/output of the first and/or the second processor.

21. The chip-integrated multiprocessor system according to claim 18, wherein the processing module is a compression/decompression module or an encryption/decryption module.

22. The chip-integrated multiprocessor system according to claim 18, wherein one or a plurality of buffer memories are arranged between the input/output of the first and/or the second processor and the shared tightly coupled semiconductor memory.

23. The chip-integrated multiprocessor system according to claim 18, wherein the shared tightly coupled semiconductor memory is a two-port memory.

24. The chip-integrated multiprocessor system according to claim 18, wherein the shared tightly coupled semiconductor memory is assigned a semiconductor memory expansion, in particular an SRAM memory, which can be accessed by the first and second processors via the inputs/outputs.

25. The chip-integrated multiprocessor system according to claim 18, wherein one processor is a digital signal processor and the other processor is a RISC microprocessor.

26. The chip-integrated multiprocessor system according to claim 18, wherein the first and second processors each have further inputs/outputs which are connected by a bus architecture to a further shared memory.

\* \* \* \* \*